United States Patent
Kolk et al.

(10) Patent No.: US 6,643,567 B2
(45) Date of Patent: Nov. 4, 2003

(54) ENERGY CONSUMPTION ESTIMATION USING REAL TIME PRICING INFORMATION

(75) Inventors: Richard A. Kolk, Glastonbury, CT (US); Raymond J. Archacki, Jr., Wethersfield, CT (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/057,838

(22) Filed: Jan. 24, 2002

(65) Prior Publication Data

US 2003/0139854 A1 Jul. 24, 2003

(51) Int. Cl.[7] .............................................. G05D 23/00
(52) U.S. Cl. ...................... 700/296; 700/295; 165/228; 340/825.24
(58) Field of Search ................................. 700/291, 295, 700/296; 340/825.24; 165/228

(56) References Cited

U.S. PATENT DOCUMENTS

| | | | |
|---|---|---|---|
| 5,168,170 A | * 12/1992 | Hartig | ........................ 700/296 |
| 5,717,609 A | 2/1998 | Packa et al. | |
| 5,761,083 A | * 6/1998 | Brown, Jr. et al. | ......... 700/296 |
| 5,984,002 A | * 11/1999 | Kido et al. | ................. 165/228 |
| 6,178,362 B1 | * 1/2001 | Woolard et al. | ............ 700/295 |

* cited by examiner

Primary Examiner—Albert W. Paladini
Assistant Examiner—W. Russell Swindell
(74) Attorney, Agent, or Firm—Carlson, Gaskey & Olds

(57) ABSTRACT

A system for estimating energy cost savings during curtailment periods, for example, determines an estimated temperature in the zone during the period of interest as if the thermostat were set at a temperature different than the actual set point temperature. By determining a difference in the estimated temperature in the zone and the actual temperature over time, the amount of energy savings can be estimated. Applying real time energy cost data to the estimated energy savings provides a real time estimation of actual cost savings during a selected period. The inventive estimation technique includes determining an equilibrium condition for the zone as part of the estimation process.

19 Claims, 2 Drawing Sheets

ENERGY CONSUMPTION ESTIMATION USING REAL TIME PRICING INFORMATION

BACKGROUND OF THE INVENTION

This invention generally relates to temperature controls and more particularly to a temperature control strategy that uses real time pricing information to provide an estimation of energy savings at selected times.

A variety of temperature control devices are commercially available to allow individuals to control the temperature within associated zones such as rooms, sections of a building or entire buildings. Over time thermostats have become more sophisticated and have included beneficial features. For example, programmable thermostats that allow an individual to set varying temperatures at varying times on a chosen schedule allow for more efficient energy use depending on the needs within the associated zone at particular times on a typical day.

In addition to the individual's ability to set a schedule for varying temperatures, it has been proposed to permit an outside source, such as a utility company, to effectively reset an individual's chosen set point temperature during a so-called curtailment period. The curtailment period would typically be utilized by a utility company to reduce the amount of energy consumption at strategic times.

Energy savings associated with such set point curtailments are calculated and posted on a regular monthly or similar billing cycle. Using such information, an individual can determine the amount of energy and associated cost savings achieved during set point curtailments.

There is a need for enhanced communication of energy savings information to an individual on a more individualized and readily available basis. This invention addresses that need in a unique fashion.

SUMMARY OF THE INVENTION

In general terms, this invention is a system and method for providing energy savings estimation information to an individual.

A system designed according to this invention includes a thermostat device that has a first input for selecting a first target temperature for the corresponding zone and a second input for changing the target temperature from the first target temperature to a second target temperature. The thermostat device also has a temperature sensor that provides information regarding an actual temperature in the zone. An estimator module gathers information regarding the actual temperature in the zone over a selected period of time when the system is set at one of the first or the second target temperature. The estimator module estimates a temperature in the zone over said selected period as if the system were set at the other of the first or second target temperature and provides an energy difference based upon a comparison between the actual temperature and the estimated temperature over said selected period.

The second input preferably is capable of receiving information from a second source remotely located from the thermostat device. The second input in one example communicates with a utility company so that the utility company can alter the target temperature for the zone during an energy usage curtailment period. In such an example, the estimator module provides an indication of the energy savings during the curtailment period. The estimator module preferably compares an actual temperature profile of the zone at the reset target temperature to an estimated temperature profile that indicates what the temperature would have been if the target temperature were not reset.

A method of this invention for determining an energy savings during a curtailment period where a target temperature for a selected zone is changed from a preselected target temperature includes several steps. An actual temperature in the zone is determined during the curtailment period with the changed target temperature. An estimated temperature in the zone during the curtailment period is determined as if the preselected target temperature were used during the curtailment period. A difference between the actual temperature and the estimated temperature over the curtailment period is then determined. An amount of energy saved is determined based upon the determined difference between the actual temperature and the estimated temperature over the curtailment period.

In one example, the rate of heat flow carried by supply air into the zone, a thermal capacitance of the air in the zone and a thermal resistance of the walls separating the zone from unconditioned air are used to determine the estimated temperature in the zone during the curtailment period as if the preselected target temperature were used. An equilibrium condition for the zone preferably is determined during the time period when the target temperature is the preselected target temperature. The equilibrium condition information is then used to determine the rate of heat flow carried by the supply air into the zone, the thermal capacitance of the air in the zone and the thermal resistance of the walls. This information is then used when estimating the temperature in the zone during the curtailment period as if the preselected target temperature were used during the curtailment period instead of the changed target temperature.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
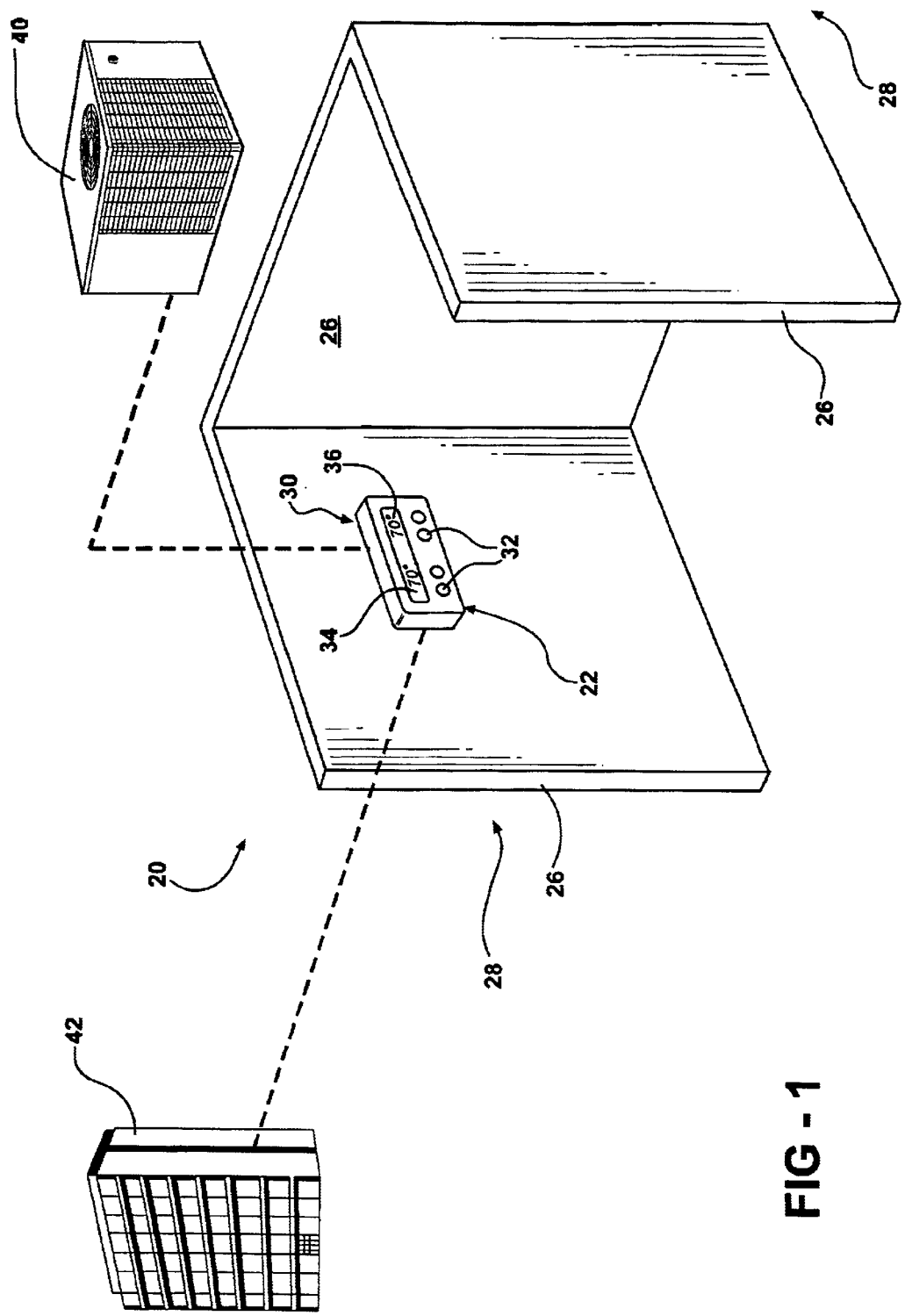
FIG. 1 schematically illustrates a system designed according to this invention.

A temperature controlling system 20 includes a thermostat 22 that is useful for setting a desired temperature within a zone 24. A "zone" for purposes of this description may be a room, a portion of a building or an entire building, depending on the needs of a particular situation. Those skilled in the art who have the benefit of this description will realize that the inventive arrangement can be utilized for a variety of settings or scenarios depending on the needs of a particular situation.

For purposes of discussion, the zone 24 will be considered to be defined by a plurality of walls 26 that separate the zone 24 from outside or other unconditioned space 28. In an example where the zone 24 constitutes an entire dwelling, the unconditioned air 28 can be considered the air or temperature conditions outside of the dwelling and the exterior walls of the dwelling are those that separate the zone of interest 24 from the ambient environment 28.

The thermostat 22 in the illustrated example includes a display portion 30 and a user input portion 32 that provides an interface between the thermostat 22 and a user. The display 30 preferably provides a visible indication of selected information to an individual such as a current zone temperature reading 34 and a set point or target temperature 36. The user input portion 32 preferably includes one or more switches or a keypad, for example, that allows the user to input selected information to the thermostat 22 so that the user can select the desired temperature within the zone 24, for example.

The thermostat 22 preferably controls operation of a HVAC unit 40 in a conventional manner. The HVAC unit 40 may be an air conditioner, a heat pump, a furnace or other device or a combination of such devices, depending on the needs of a particular situation. The inventive arrangement is not limited necessarily to one particular form of HVAC system.

The thermostat device 22 preferably is capable of communicating with a remotely located outside source 42 such as a utility company facility. The outside source 42 preferably has the capability of instructing the thermostat device 22 to reset the target temperature 36 within the zone 24 under selected conditions. Other types of information may be shared between the thermostat device 22 and the outside source 42 as the needs of a particular situation may dictate. An example of such information includes energy pricing data to enable the system 20 to provide real time cost savings as will be described below.

Figure 2:
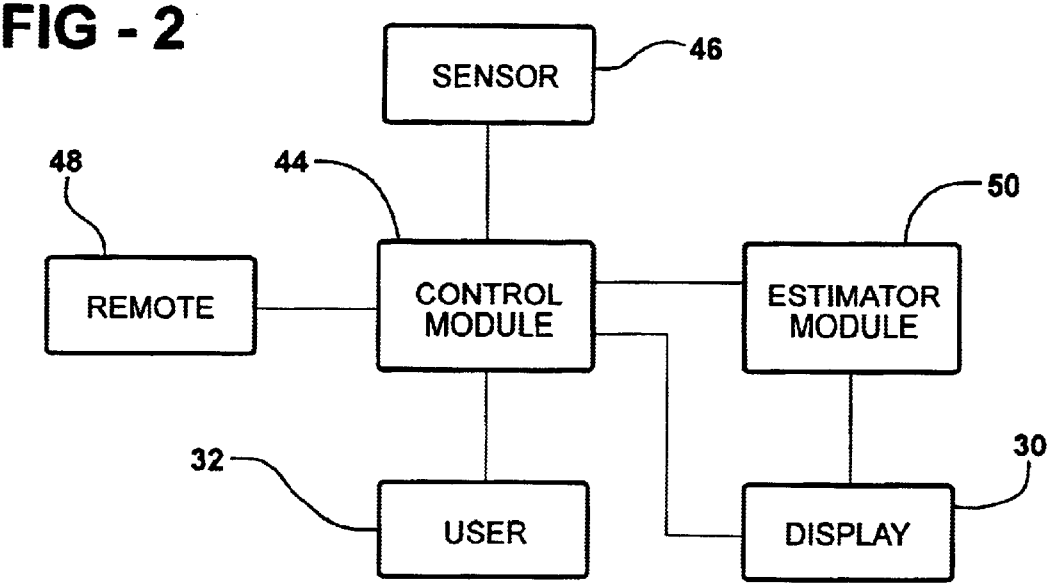
FIG. 2 schematically illustrates, in somewhat more detail, selected portions of the embodiment illustrated in FIG. 1.

As schematically illustrated in FIG. 2, the thermostat device 22 preferably includes a control module 44 that is programmed to cause the desired operation of the thermostat device 22 and the HVAC system 40. The control module 44 receives information from the user input portion 32 and a conventional temperature sensor arrangement 46. Depending on the zone of interest, the sensor arrangement 46 may take a variety of conventional forms. The control module 44 preferably is programmed to control the operation of the HVAC system 40 so that the desired temperature within the zone 24 is maintained accordingly.

A remote communication module 48 facilitates communications between the outside source 42 and the thermostat device 22. The remote communication module may comprise separate components from the control module 44 or may be a subsection of the control module 44, depending on the needs of a particular situation. In one example, the control module 44 is a microprocessor that includes a transceiver that operates as the remote communication module 48.

The individual modules schematically illustrated in FIG. 2 are so illustrated for discussion purposes only. Discrete components may be used for the individual modules or their respective functions may be performed by a single controller suitably programmed. Those skilled in the art who have the benefit of this description will be able to select from among commercially available controllers and components to realize a thermostat device that performs the functions of the illustrated example. Similarly, those skilled in the art who have the benefit of this description will be able to suitably program a microprocessor to perform the functions of the control module 44 or other portions of the thermostat device 22.

An estimator module 50 provides an estimation of energy savings during certain times. One example includes curtailment periods where the user's preselected target temperature is changed by the outside source 42 for a certain amount of time. In another example, the user is able to enter an estimation temperature and a time frame, which the estimator module 50 uses to estimate energy savings. This latter example may be useful, for example, to allow an individual to determine how much cost savings might be realized by changing the set point temperature.

The estimator module preferably uses an estimation strategy as will be described below. Information from the estimator module 50 regarding energy savings preferably is provided to the user through the display 30 so that the user is able to obtain energy savings information on a real time basis as desired. Additionally, information from the estimator module preferably is stored in memory so that it can be later accessed or used for compilation of energy savings over selected time periods. Such memory may be part of the thermostat device 22 or be at the remote location 42, for example.

The estimator module 50 preferably uses an estimation approach based upon a determination of an equilibrium condition for the zone of interest. In one example, the equilibrium condition is expressed by the following equation:

$$Q\text{out} - Q\text{in} + Q e = 0 \tag{EQ.1}$$

where

Qout=rate of heat flow carried out by air leaving room (in BTU/hr)

Qin=rate of heat flow carried in by air entering room (in BTU/hr)

Qe=rate of heat flow through room walls (in BTU/hr)

Several other parameters are defined as follows:

Tzone=zone temperature (in degrees F)

Tin=temperature of air entering room (in degrees F)

Tout=temperature of air leaving room=Tzone (in degrees F)

Tamb=temperature of air surrounding room (in degrees F)

C=thermal capacitance of air in the zone 24

R=thermal resistance of the walls 26 m=air flow, lb/hr (Density of air=0.076 lb/f$^3$)

Cp=specific heat of air=0.24 BTU/(lb-deg F)

In this example, several assumptions are made for purposes of making the equilibrium determination. The first assumption is that there is no heat storage in the walls 26 that define the zone 24. Second, the air within the zone 24 is assumed to be completely mixed. Another assumption associated with this example is that there are no heat sources within the zone apart from the HVAC system 40. In other words, the example estimation technique assumes that people, lights, candles, etc., are not present in the zone 24 to have an effect on the temperature within the zone.

Given the assumptions and the variable definitions for this example, it follows that:

Qout=m*CP*Tzone

Qin=m*Cp*Tin

Qe=(Tzone−Tamb)/R

Accordingly, Eq. 1 can be expressed as follows:

$$C\frac{d(Tzone)}{dt} + m \cdot C_p \cdot Tzone - m \cdot C_p \cdot Tin + (Tzone - Tamb)/R = 0 \tag{EQ. 2}$$

which can be expressed as follows:

$$\dot{T}zone = \frac{m \cdot C_p}{C}(Tin - Tzone) + \frac{1}{RC}(Tamb - Tzone) \qquad (EQ.\ 3)$$

which can be solved to determine the change in the zone temperature over time.

Using a conventional technique for converting the differential EQ. 3 into a difference equation so that it is more easily solved by the microprocessor estimator module 50, EQ. 3 can be approximated as:

$$\dot{T}zone = \frac{Tzone_{k+1} - Tzone_k}{\Delta t} = \qquad (EQ.\ 4)$$

$$\frac{m \cdot C_p}{C}(Tin_k - Tzone_k) + \frac{1}{RC}(Tamb_k - Tzone_k)$$

Because $Tin_k$ and $Tamp_k$ are approximately constant and by making other simplifications, the previous equation can be expressed as:

$$\dot{T}zone = \frac{Tzone_{k+1} - Tzone_k}{\Delta t} = \qquad (EQ.\ 5)$$

$$\frac{m \cdot C_p}{C}(Tin - Tzone_k) + \frac{1}{RC}(Tamb - Tzone_k)$$

By collecting terms and reducing, the equation becomes:

$$Tzone_{k+1} = \qquad (EQ.\ 6)$$

$$\left(1 + \frac{\Delta t}{RC} - \frac{m \cdot C_p \cdot \Delta t}{C}\right)Tzone_k + \frac{m \cdot C_p \cdot \Delta t}{C}Tin - \frac{\Delta t}{RC}Tamb,$$

which can be expressed as:

$$Tzone_{k+1} = \theta_1 Tzone_k + \theta_2 Tin - \theta_3 \qquad (EQ.\ 7)$$

Using a conventional estimation approach, the preceding equation (EQ. 7) provides information to estimate the zone temperature over time.

According to one example implementation of this invention, a least square approach permits solving for the θ values using historical data regarding the zone 24 and the operation of the HVAC system 40. Using such historical data, the θ values become known based upon the historical data and provide a basis to predict the zone temperature under assumed conditions.

The least squares approach used in this particular example implementation of this invention can be described as follows. Depending on the region of operation, the heat balance and temperature differential equations can be approximated as follows. When the system 40 is off, the supply air is off and m=0. Therefore, EQ. 6 becomes:

$$Tzone_{k+1} = \left(1 + \frac{\Delta t}{RC}\right)Tzone_k - \frac{\Delta t}{RC}Tamb \text{ or}$$

$$Tzone_{k+1} = \theta_4 Tzone_k - \theta_3$$

When the system 40 is on and making a further assumption that there is no heat absorbed from the outside environment 28 (or no heat loss from the zone 24, depending on the temperature conditions), EQ. 6 becomes:

$$Tzone_{k+1} = \left(1 + \frac{\Delta t}{RC} - \frac{m \cdot C_p \cdot \Delta t}{C}\right)Tzone_k + \frac{m \cdot C_p \cdot \Delta t}{C}Tin - \frac{\Delta t}{RC}Tamb \text{ or}$$

$$Tzone_{k+1} = \theta_1 Tzone_k + \theta_2 Tin - \theta_3$$

The number of estimated parameters can be reduced to three by recognizing that $\theta_4 = \theta_1 + \theta_2$. Applying a conventional estimation technique such as a least square algorithm during the times when the system 40 is on provides an estimation of the unknown parameters. An example least square algorithm can be summarized as:

$$[Tzone_{k+1}] = [Tzone_k \quad Tin \quad 1] \cdot \begin{bmatrix} \theta_1 \\ \theta_2 \\ \theta_3 \end{bmatrix}$$

$$[Tzone_{k+1}] = A \cdot \Theta \Rightarrow \Theta = inv(A^T A)A^T [Tzone_{k+1}]$$

The estimation algorithm of this example implementation of this invention includes estimating the value for R (i.e., the thermal resistance of the walls 26), the value for C (i.e., the thermal capacitance of air in the zone 24) and Qin/m (i.e., the rate of heat flow carried by air entering the zone divided by the air flow expressed in pounds per hour). These values are estimated using the least squares approach applied when the system is on and off, respectively.

Once those parameters have been estimated, the estimated parameters, the set point before a curtailment period and the duty cycle status of the HVAC system 40 is applied to the estimation model (EQ. 7) by the estimator module 50 to predict the zone temperature profile as if the curtailment did not occur. Determining the difference between the actual temperature profile during a curtailment period and the estimated temperature profile (determined by the estimator module 50) provides information regarding the energy savings during the curtailment period. By obtaining real time cost of energy during this curtailment period from the source 42, for example, an energy savings in dollars can be provided to the user on a real time basis through the display 30, for example, on the thermostat device 22.

Using historical data regarding the particular zone and the associated HVAC system 40 with an estimating approach as described above provides the estimator module 50, which is suitably programmed, with the ability to estimate the temperature profile within the zone 24 during any particular period. The inventive approach is particularly useful for modeling the temperature profile within a zone during a curtailment period as if the user's preselected target temperature were not changed. That information can then be compared with the actual temperature profile as a result of the changed set point temperature during the curtailment period to provide an estimation of energy savings during the curtailment period.

Figure 3:
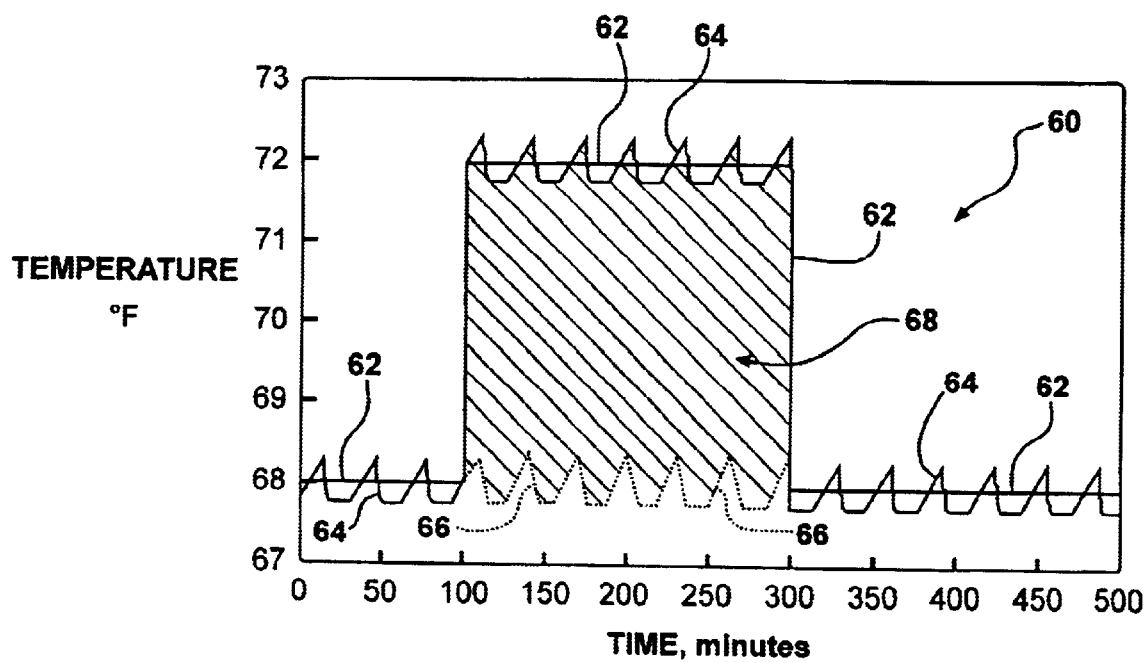
FIG. 3 is a graphical illustration of a feature of a system designed according to this invention showing an energy savings estimation.

FIG. 3 graphically illustrates an energy savings estimation utilizing the above-described example implementation of this invention. The plot 60 graphically illustrates a computation of energy savings during a curtailment period that lasts for 200 minutes (i.e., from the time period indicated at 100 minutes to the time period indicated at 300 minutes). The line 62 indicates the set point or target temperature for the zone. The user's preselected target temperature is 68°. That target temperature is changed during the curtailment period to a target temperature of 72°. This particular example illustrates a curtailment period using an air conditioning system to cool the zone 24.

The plot 64 indicates the actual temperature within the zone 24. The so-called saw tooth nature of the plot 64 is the result of the system 40 being switched between an on state and an off state over time. When the system 40 is off, for example, zone 24 tends to warm up, which corresponds to the rising portions of the plot 64. As the system 40 is turned on, the temperature then declines until the system is again turned off and the zone begins to again warm up over time.

It should be noted that the particular example implementation of this invention that is the subject of this discussion requires a sufficient input signal to allow the estimator module to utilize the estimation model described above. Such an input signal exists in an HVAC system 40 that is switched between on or off states. HVAC systems that include variable speed operation may not be adequately modeled using the example technique described above. Although this invention is not necessarily limited to use within the systems that are on or off, the use of the inventive technique in association with a variable speed HVAC system would require modification to the example estimation model described above.

As can be appreciated from FIG. 3, during the curtailment period the actual temperature within the zone is closer to 72° compared to before or after the curtailment period where the zone temperature is maintained closer to 68°. During the curtailment period when the target temperature is changed by the outside source 42 from 68° to 72°, the estimator module 50 preferably estimates the temperature within the zone as if the curtailment were not implemented. The plot in dashed lines at 66 shows the estimated temperature profile within the zone during the curtailment period. This plot is based upon the estimator module 50 solving EQ. 1 (i.e., EQ. 7) over time throughout the curtailment period using the historical data and the estimated parameters described above. In this example, the estimator module 50 utilizes the actual on and off state of the system 40 during the estimation, which provides the so-called saw tooth shape of the plot 66.

The estimator module 50 preferably accumulates the difference in temperature of the actual zone temperature at 64 and the estimated zone temperature 66 throughout the entire curtailment period. This portion of the plot in FIG. 3 is shown cross-hatched at 68. By integrating this information over time, the estimator module 50 provides an estimation of the amount of energy saved during the curtailment period. By obtaining the real cost of energy during the curtailment period, the thermostat device 22 is able to provide the user information regarding the actual cost savings during the curtailment period.

By utilizing the preselected set point or target temperature prior to a curtailment period, the inventive arrangement provides the ability to determine energy savings during a curtailment period. Another use of the inventive approach would be to allow a user to enter an estimation temperature that the estimator module 50 would use to estimate the energy usage within the zone 24 compared to an actual temperature over a user-selected period of time. This would allow a user to estimate cost savings if the user were to adjust thermostat settings within the zone during different times. This may be useful, for example, for an individual to determine how much they would save if they were to change their thermostat setting by several degrees and then to make a decision whether any sacrifice in zone temperature comfort level would be worth the associated cost savings.

The inventive arrangement, therefore, provides a significant advantage in allowing a user to determine cost savings on a real time basis based upon a comparison of different target temperatures within a zone over selected periods of time.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of determining an energy savings during a curtailment period where a target temperature for a selected zone is changed from a preselected target temperature, comprising the steps of:
   (A) determining an actual temperature in the zone during the curtailment period with the changed target temperature;
   (B) determining an estimated temperature in the zone during the curtailment period if the preselected target temperature were used;
   (C) determining a difference between the actual temperature and the estimated temperature over the curtailment period; and
   (D) determining an amount of energy saved, using the determined difference.

2. The method of claim 1, wherein step (B) includes determining a rate of heat flow carried by supply air into the zone, a thermal capacitance of the air in the zone and a thermal resistance of walls separating the zone from unconditioned air.

3. The method of claim 2, wherein step (B) includes determining an equilibrium condition for the zone during a time period when the target temperature is a known temperature and using the equilibrium condition information to determine the rate of heat flow carried by supply air into the zone, a thermal capacitance of the air in the zone and a thermal resistance of walls separating the zone from unconditioned air.

4. The method of claim 3, including using a least squares estimation to determine the rate of heat flow carried by supply air into the zone, a thermal capacitance of the air in the zone and a thermal resistance of walls separating the zone from unconditioned air based upon observed conditions in the zone when the target temperature is the known temperature.

5. The method of claim 1, wherein step (B) includes determining an equilibrium condition for the zone.

6. The method of claim 5, wherein determining the equilibrium condition by determining a relationship between a rate of heat flow carried out of the zone by air leaving the zone, a rate of heat flow carried by air entering the zone and a rate of heat flow through walls separating the zone from unconditioned air.

7. The method of claim 6, wherein the relationship requires that the rate of heat flow carried by air entering the zone is equal to the rate of heat flow carried out of the zone by air leaving the zone plus the rate of heat flow through the walls separating the zone from unconditioned air.

8. The method of claim 5, wherein step (B) includes determining a rate of heat flow carried by supply air into the zone, a thermal capacitance of the air in the zone and a thermal resistance of walls separating the zone from unconditioned air.

9. The method of claim 5, wherein the equilibrium condition includes a model for temperature behavior in the zone based upon observed temperature changes in the zone when the target temperature is a known temperature.

10. The method of claim 1, including determining a cost of energy during the curtailment period and using the cost to determine a cost savings during the curtailment period.

11. The method of claim 1, including integrating the determined difference over the curtailment period.

12. A system for estimating energy savings in a selected zone, comprising:

a thermostat device having a first input for selecting a first target temperature for the zone and a second input for changing the target temperature from the first target temperature to a second target temperature and a temperature sensor that provides information regarding an actual temperature in the zone; and an estimator module that gathers information regarding the actual temperature in the zone over a selected period of time when the system is set at the second target temperature and estimates a temperature in the zone over said selected period as if the system were set at the first target temperature and provides an energy difference based upon a comparison between the actual temperature and the estimated temperature over said selected period.

13. The system of claim 12, wherein the estimator module determines an equilibrium condition for the zone based upon observed temperature changes in the zone during a time period when the target temperature is a chosen temperature.

14. The system of claim 12, wherein the estimator module determines an equilibrium condition for the zone.

15. The system of claim 14, wherein the estimator module determines the equilibrium condition by determining a relationship between a rate of heat flow carried out of the zone by air leaving the zone, a rate of heat flow carried by air entering the zone and a rate of heat flow through walls separating the zone from unconditioned air.

16. The system of claim 14, wherein the estimator module uses an equilibrium model that requires that the rate of heat flow carried by air entering the zone is equal to the rate of heat flow carried out of the zone by air leaving the zone plus the rate of heat flow through the walls separating the zone from unconditioned air.

17. The system of claim 12, wherein the estimator module uses a cost of energy during the selected period and determines a cost savings during the selected period.

18. The system of claim 12, wherein the second input is capable of receiving target temperature setting information from a second source located remote from the thermostat device.

19. The system of claim 12, including a display that provides a visible indication of the determined energy difference during the selected period.

* * * * *